US008639824B1

United States Patent
Basu et al.

(10) Patent No.: US 8,639,824 B1
(45) Date of Patent: Jan. 28, 2014

(54) SYSTEM AND METHOD FOR DYNAMIC ACCOUNT MANAGEMENT IN A GRID COMPUTING SYSTEM

(75) Inventors: Sujoy Basu, Mountain View, CA (US); Vanish Talwar, Palo Alto, CA (US); Rajendra Kumar, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2376 days.

(21) Appl. No.: 10/666,092

(22) Filed: Sep. 19, 2003

(51) Int. Cl.
*G06F 15/16* (2006.01)

(52) U.S. Cl.
USPC .......................................................... 709/229

(58) Field of Classification Search
USPC .................. 709/203, 205, 226, 229; 713/178
See application file for complete search history.

(56) References Cited

U.S. PATENT DOCUMENTS

| | | | |
|---|---|---|---|
| 6,065,054 A * | 5/2000 | Dutcher et al. | 709/226 |
| 6,789,078 B2 * | 9/2004 | Saitou et al. | 707/10 |
| 6,950,818 B2 * | 9/2005 | Dennis et al. | 707/3 |
| 7,007,091 B2 * | 2/2006 | Inada et al. | 709/226 |
| 2002/0078212 A1 * | 6/2002 | Besaw et al. | 709/228 |
| 2002/0120499 A1 * | 8/2002 | Liu et al. | 705/14 |
| 2002/0143923 A1 * | 10/2002 | Alexander | 709/223 |
| 2002/0169964 A1 * | 11/2002 | Klook | 713/178 |
| 2003/0140004 A1 * | 7/2003 | O'Leary et al. | 705/39 |
| 2004/0044866 A1 * | 3/2004 | Casazza | 711/163 |
| 2004/0128374 A1 * | 7/2004 | Hodges et al. | 709/223 |
| 2004/0139202 A1 * | 7/2004 | Talwar et al. | 709/229 |
| 2004/0221038 A1 * | 11/2004 | Clarke et al. | 709/226 |
| 2005/0027865 A1 * | 2/2005 | Bozak et al. | 709/226 |

OTHER PUBLICATIONS

Hacker, Thomas and Athey, Brian, A Methodology for Account Mangement in Grid Computing Environments, C.A. Lee (Ed.): GRID 2001, LNCS 2242, pp. 133-144, Nov. 12, 2001.*

* cited by examiner

*Primary Examiner* — Jason Recek

(57) ABSTRACT

A system and method for dynamic account management in a grid computing system. In one embodiment, a system for dynamic account management in a grid computing system is disclosed. The system comprises a distributed resource management system, and a link mapper that is coupled to the distributed resource management system. The link mapper provides a unique symbolic link comprising a modified user identifier to a user. As such, the user is authorized by providing a dynamic account that is associated with the symbolic link to the user.

29 Claims, 7 Drawing Sheets

| | DISTINGUISHED NAME | SYMBOLIC LINK PRECURSOR | DYN. ACCT.# | G | A |
|---|---|---|---|---|---|
| 605 | /A1=V1/A1=V2/.../An=Vn | /A1=V1/A1=V2/.../An=Vn/<current date &time> | dyn_XXX | Y/N | Y/N |
| 610 | /O=HP/OU=HPLabs/ Email=bob.smith@hp.com | /O=HP/OU=HPLabs/Email=bob.smith@hp.com/ [timestamp1] | dyn_001 | N | Y |
| 615 | /O=HP/OU=HPLabs/ Email=alice.green@hp.com | /O=HP/OU=HPLabs/Email=bob.smith@hp.com/ [timestamp2] | dyn_002 | N | Y |
| 625 | /O=HP/OU=HPLabs/ Project=X | /O=HP/OU=HPLabs/Project=X/ timestamp3 | dyn_003 | Y | Y |
| 630 | /O=HP/OU=HPLabs/ Project=X | /O=HP/OU=HPLabs/Project=X/ timestamp4 | dyn_004 | Y | Y |
| 635 | -- | -- | dyn_005 | N | N |

SYSTEM AND METHOD FOR DYNAMIC ACCOUNT MANAGEMENT IN A GRID COMPUTING SYSTEM

TECHNICAL FIELD

Embodiments of the present invention relate to a grid computing environment, and more particularly to the handling of dynamic user accounts within the grid computing environment.

BACKGROUND ART

Grid computing is a method of harnessing the power of many computational resources in a network. Grid computing is a distributed computer infrastructure involving large-scale sharing applications and/or high performance processing and network bandwidth.

Referring to FIG. 1, a grid computing environment comprising a plurality of heterogeneous computing nodes distributed across multiple administrative domains. A virtual organization (e.g., VO-X, VO-Y, and VO-Z) may include nodes from different domains. For example, VO-Z includes nodes from each of Administrative Domains 110, 120, and 130.

A node (hereinafter also referred to as a computing resource) may be a member of several virtual organizations. An end-user (e.g., USER M, USER N, or USER O) may need to access remote nodes either in the same administrative domain, or across domains. For example, User O may access VO-Y from within Domain 120, or User N within Domain 130 may access the same node from outside of Domain 120. Similarly, User M of Domain 130 may access both VO-Y and VO-Z through a single node in Domain 110.

Traditionally, grid computing has provided for the execution of batch jobs in the scientific and academic community. Batch execution on a grid computing environment requires authentication, authorization, resource access, resource discovery, and other services. In support of batch processing of jobs on a grid computing environment, protocols, services, application programming interfaces, and software development kits have been developed. The conventional method and system are not particularly suited for interactive grid computing sessions.

A grid user must typically be granted authorization by an administrator of the domain to which the desired resource belongs. This usually entails generating a policy file for each user. However, requiring a user to have local accounts for the resources that can possibly be allocated to him has several drawbacks. A system using static accounts is difficult to scale, since there may be millions of potential users of a system by virtue of their membership in the grid. As members get added or removed from a grid, local system administrators at participating sites cannot be expected to add or delete user accounts. The maintenance of millions of accounts, for example, at the participating sites using methods provided by operating systems would be a very heavy burden for system administrators.

In systems having large numbers of occasional users, dynamic accounts may be used to avoid having to deal with the problems of maintaining a large number of static accounts. A dynamic account is not permanently associated with a real-world user. It is assigned to a user for the duration of one or more interactive sessions or batch jobs on the allocated computer. When the association ends, the dynamic account is returned to the free pool and is available for assignment to another user.

Although dynamic accounts avoid the difficulty of having to maintain static accounts for all potential users, there is still considerable overhead involved in managing the set of dynamic accounts. For each account, an administrator is typically required to add an entry to a gridmap file, creating a mapping between the user's grid credentials and the pool of dynamic accounts to be used. This entry uses the part of the grid credentials that is known as the user's distinguished name (DN). The DN is based upon a hierarchical naming standard that makes it possible to uniquely identify the user.

Normally, the DN of a user is extracted from his credentials and a file is created in the file system with the DN. This file is actually a symbolic link that points to another file that is named with the dynamic account allocated to the user. If a second user initiates a session using a DN linked to a current dynamic account, the second user will be assigned to the same dynamic account. Under conventional dynamic account management, if two users sharing a common grid credential are allocated the same resource, both of their sessions will run on the same dynamic account. This creates an unstable situation in which the two users may overwrite each others files and terminate each others processes. What is needed is a dynamic account management method that reduces the burden on local domain administrators and allows users to share a DN without potential interference.

DISCLOSURE OF THE INVENTION

A system and method for dynamic account management in a grid computing system. In one embodiment, a system for dynamic account management in a grid computing system is disclosed. The system comprises a distributed resource management system, and a link mapper that is coupled to the distributed resource management system. The link mapper provides a unique symbolic link comprising a modified user identifier to a user. As such, the user is authorized by providing a dynamic account that is associated with the symbolic link to the user.

BRIEF DESCRIPTION OF THE DRAWINGS

The above and other objects and advantages of the present invention will be more readily appreciated from the following detailed description when read in conjunction with the accompanying drawings, wherein:

FIG. 6 shows a dynamic account management data table for a grid computing system, in accordance with an embodiment of the present invention.

BEST MODES FOR CARRYING OUT THE INVENTION

Figure 1:
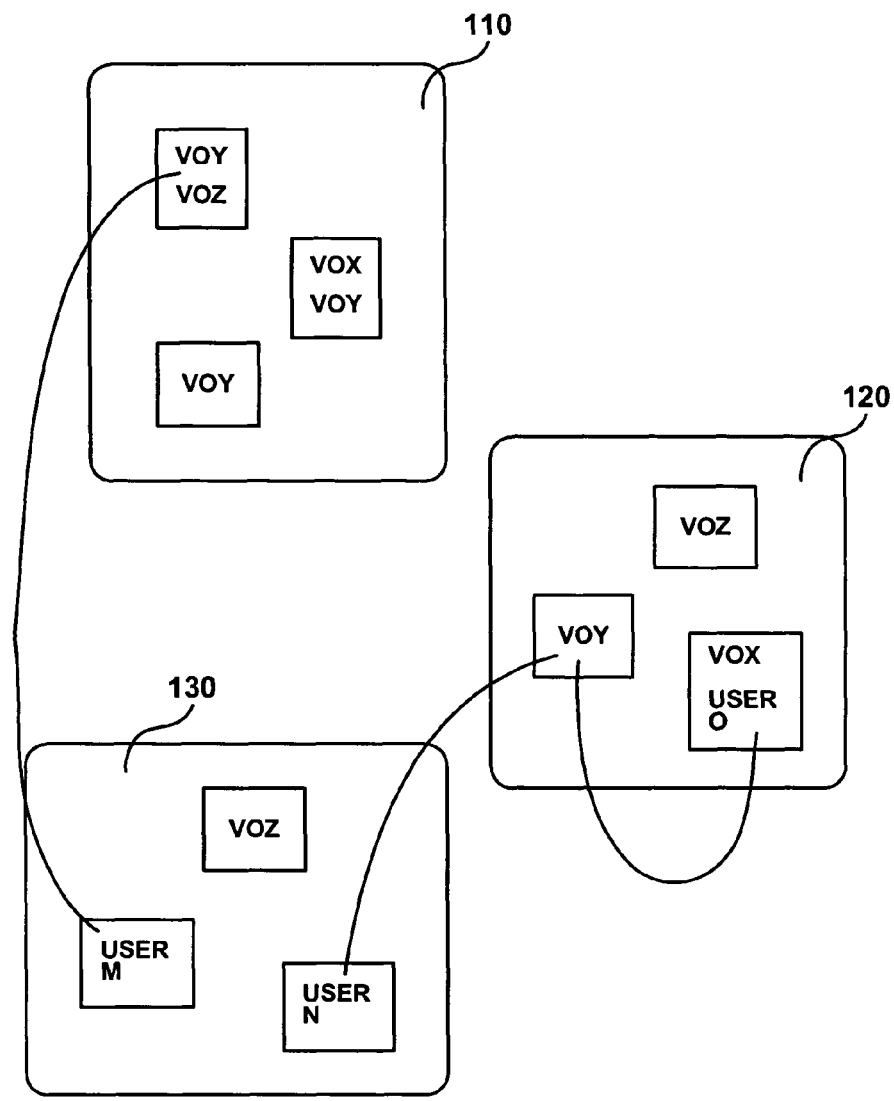
FIG. 1 is an illustration of a grid computing environment.

Reference will now be made in detail to embodiments of the present invention, a system and method for dynamic account management in a grid computing system, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Embodiments of the present invention can be implemented on software running on a computer system. The computer system can be a personal computer, notebook computer, server computer, mainframe, networked computer, handheld computer, personal digital assistant, workstation, and the like. This software program is operable for managing a dynamic user account in a grid computing system. In one embodiment, the computer system includes a processor coupled to a bus and memory storage coupled to the bus. The memory storage can be volatile or non-volatile and can include removable storage media, e.g., computer-readable medium. The computer can also include a display, provision for data input and output, etc.

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "selecting," or "combining," or "assigning," or "linking," or "authenticating," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Grid Computing Environment for Conducting Interactive Computing Sessions

Figure 2:
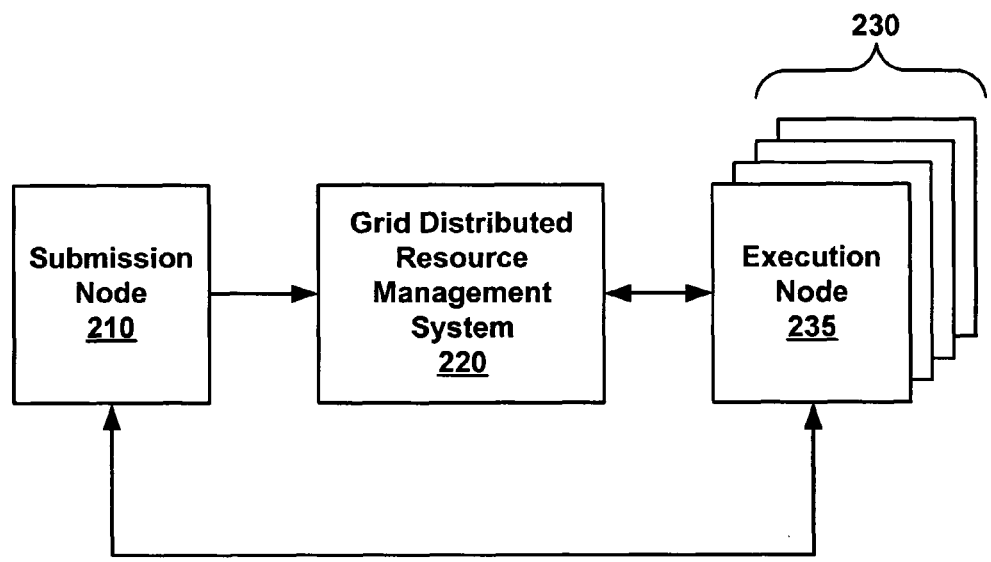
FIG. 2 is a data flow diagram illustrating the flow of information when implementing a grid computing environment, in accordance with one embodiment of the present invention.

Referring now to FIG. 2, a data flow diagram is shown illustrating the implementation of an exemplary grid computing system 200, in accordance with one embodiment of the present invention. The grid computing system consists of a plurality of heterogeneous execution nodes 230 distributed across multiple administrative domains. The plurality of execution nodes 230 is managed by a grid distributed resource management (DRM) system 220.

The grid computing system 200 is capable of supporting graphical interactive sessions. A general discussion describing graphical interactive sessions is provided in the following co-pending U.S. patent application assigned to the present assignee: Ser. No. 10/340,436, entitled "GRID COMPUTING CONTROL SYSTEM," by Talwar et al., filed on Jan. 10, 2003, the disclosure of which is hereby incorporated herein by reference.

In the data flow diagram of FIG. 2, an end-user submits a request for an interactive session to the grid DRM through a submission node 210. On receiving the request from the user the grid DRM selects a remote execution node 235 based on the session requirements, and reserves this node 235 for the requested duration of the session. In addition, the grid DRM also performs an advance reservation of fine grained resources like central processing unit (CPU) and network bandwidth for the user's session. At the requested time, the grid DRM would establish an interactive session between this remote execution node 235 and the end-user's submission node 210. The end-user then interacts directly with this remote execution node 235 through the established session.

Figure 3:
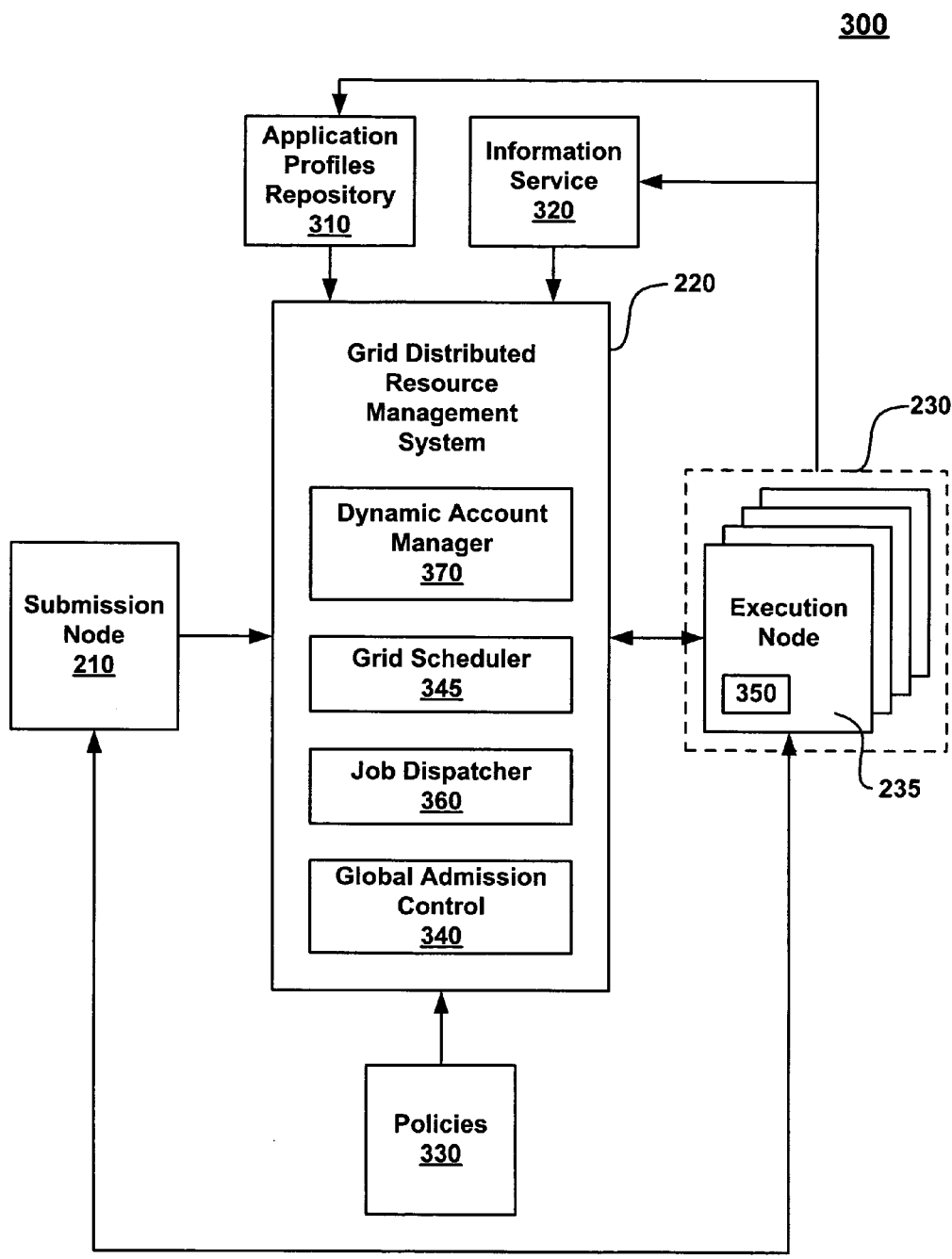
FIG. 3 is a block diagram illustrating an exemplary grid computing environment.

Referring now to FIG. 3, a block diagram of an exemplary grid computing environment 300 is shown in more detail, in accordance with one embodiment of the present invention. The grid computing environment 300 comprises a submission node 210, a grid distributed resource management (DRM) system 220, and a plurality of execution nodes 230, as previously described in relation to FIG. 2.

In addition, the grid computing environment 300 also comprises an information service 320. The information service 320 stores information about the computing resources associated with and located at each of plurality of execution nodes 230. In addition, an application profiles repository 310 stores the application profiles of the grid computing environment 300. The policies module 330 provides the rules and policies for implementing and running the grid computing environment 300.

In one embodiment of the present invention, the end-user can submit requests directly to the remote execution node 235, to launch multiple applications. A session launching multiple applications is defined as a global interactive session. This global interactive session thus constitutes the interaction of the end-user with the remote node, and involves the launching of one or more applications. Subsequently, the end-user in the session uses and interacts with the launched applications through separate per-application sessions. These interactions could be textual or graphical based. As such, the grid computing system 200 supports graphical interactive sessions between end-users and remote execution nodes. An example of a global interactive session is a remote display session wherein the graphical desktop of the remote execution node 235 is exported to the submission node 210.

In another embodiment of the present invention, the end-user submits requests to launch a single application. A session launching one application is defined as a per application interactive session. A per-application interaction session constitutes the association between the end-user and the executing application, where the end-user interacts directly with the application. A per-application interactive session occurs in the context of a global interactive session.

In one embodiment, a hierarchical admission control is achieved through the implementation of global and per-application interactive sessions. Admission control is implemented through a global admission control module 340 at the grid DRM node 220, and a per-application session admission control module 350 at the selected remote execution node 235. The global admission control module 340 and the per-application admission control module 350 make admission control decisions for global and per-application sessions, respectively.

The following is the sequence of steps for initiating global and per-application sessions, in accordance with one embodiment of the present invention. To start, the end-user creates a job request template for a new global interactive session, specifying the resource requirements, session requirements, and the desired list of applications to be launched during the session. This request is submitted to the grid DRM node 220 from the submission node 210.

The request is received by a grid scheduler 345 running on the grid DRM node 220. In the first pass, the grid scheduler 345 performs a matching of resources in the plurality of remote execution nodes 230 to satisfy the coarse requirements of the user, for example, matching of the hardware requirements of the user. The grid DRM 220 provides a distributed repository where various resources can publish their services, in one embodiment. The grid scheduler 345 queries this distributed repository, as well as the application profiles repository 310 and the information service 320, to discover resources that match with the user's job needs.

In the next pass, the grid scheduler 345 selects the best remote execution node that can admit the requested global interactive session satisfying the quality-of-service (QoS) requirements for the desired list of applications to be launched during the global session. During this step, the grid scheduler 345 interfaces with the global admission control system 340, which performs the admission for the requested global interactive session.

At this time, a reservation is made on the selected remote execution node 235 for the requested global interactive session. The reservation is also made for fine grained resources such as CPU, network bandwidth, etc.

At the requested time, the selected remote execution node 235 is allocated to the end-user, and a job dispatcher 360 at the grid DRM 220 dispatches the request for the new global interactive session to the remote execution node 235. In addition, service level agreements (SLA) for the session are passed to the remote execution node 235.

A configuration process configures the system before launching the global interactive session. This involves the creation of a dynamic account by a dynamic account manager 370 at the grid DRM 220. A global interactive session is then initiated between the allocated execution node and the end-users' submission node. The dynamic account manager 370 maintains pools of dynamic accounts on each resource. Unlike normal user accounts which remain permanently assigned to the same real-world user, a dynamic account is assigned to a user temporarily. After the user has been authenticated, the user may be authorized to use a normal static account if authorized, or the user may be assigned a dynamic account from a pool of dynamic accounts.

Alternately the user's membership in a virtual organization (VO) may be verified by a directory service maintained by the VO. In that case, a dynamic account from the pool maintained for that VO can be assigned to the user. This approach is more scalable since every user joining or leaving a VO does not require the addition or deletion of a file entry on all the resources made available to the VO.

The end-user can now request new per-application interactive sessions directly through the started global interactive session. The requests for per-application interactive sessions are verified for access control checks, and if successful are passed onto the session admission control system 350 on the associated remote execution node (e.g., execution node 235). The session admission control system 350 performs an admission control check to determine if the requested per application session can be admitted into the global interactive session. If not, the request for new per-application session is denied. Otherwise, the per-application session is started.

In addition, for QoS purposes, resource management monitoring agents monitor the global interactive session and per-application session utilization values. The monitored data is aggregated by aggregator agents. Enforcement agents use this data to enforce the SLA and QoS requirements. For example, the enforcement agents can end the global interactive session at the time specified in the SLA.

After the global interactive session is ended, the execution node is now freed up to execute a new global interactive session if scheduled by the grid scheduler 345.

System and Method for Dynamic Account
Management in a Grid Computing System

Figure 4:
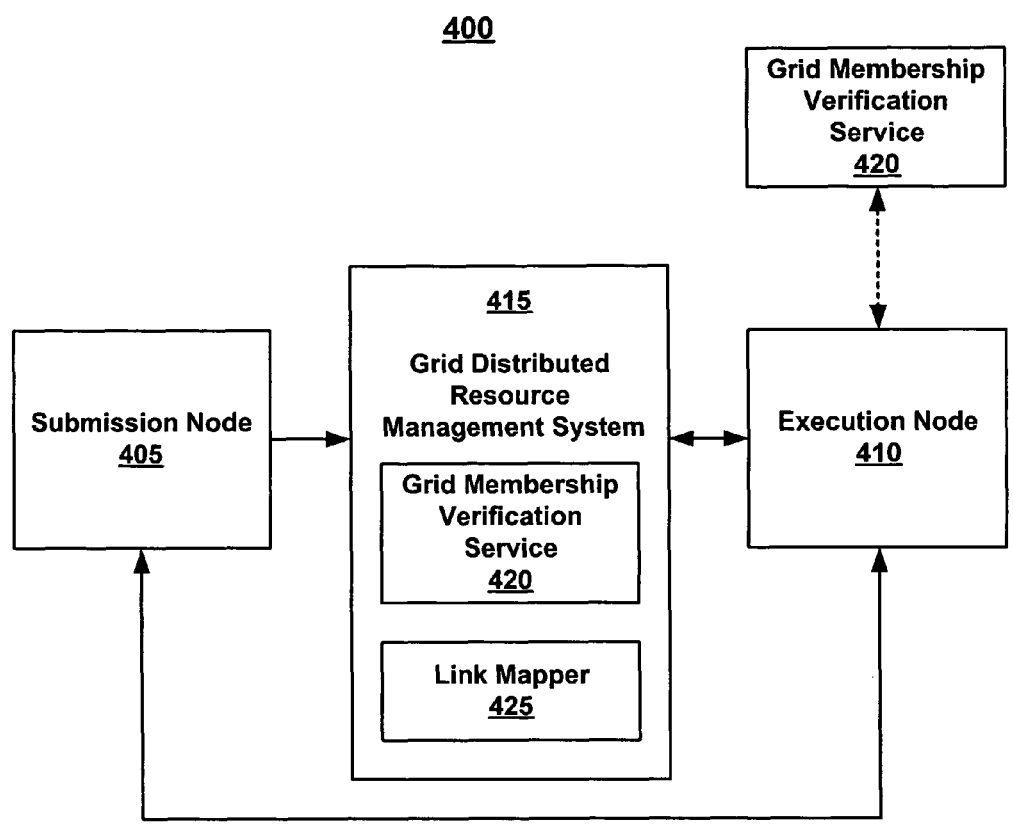
FIG. 4 shows a block diagram illustrating an exemplary grid computing environment with a grid membership verification service, in accordance with one embodiment of the present invention.

FIG. 4 shows a block diagram 400 illustrating an exemplary grid computing environment with a grid membership verification service (GMVS) 420, in accordance with one embodiment of the present invention. The submission node (user) 405, grid distributed resource management system 415 and execution node (resource) 410 are similar to the submission node 210, grid distributed resource management system 220 and execution node 235 of FIG. 3. The GMVS 420 includes a directory with entries for all members of the grid.

The GMVS 420 is a single service, but can be replicated or distributed. As shown, the GMVS 420 is associated with the grid distributed resource management system 415, but is also accessible external to the grid distributed resource management system 415 by the execution node (resource) 410. The GMVS is a single service that is available to resources for authenticating users. The GMVS 420 may also provide user profile information to the execution node 410.

The grid distributed resource management system 415 also includes a link mapper 425 that keeps track of the association between user identifiers and dynamic accounts that are allocated to users. Examples of user identifiers are an email address or a distinguished name (DN). After user credentials are authenticated by the GMVS and authorization is provided by a resource, the link mapper is used to provide access to a dynamic account. Specifically, the user is authorized by providing the dynamic account that is associated with a symbolic link. That is, the link mapper generates a symbolic link within a file system that links a file associated with a user and his/her user identifier (e.g., DN) and a file associated with a dynamic account reserved for that user. As such, the link mapper replaces the conventional gridmap files associated with each site in a grid computing environment.

Figure 5A:
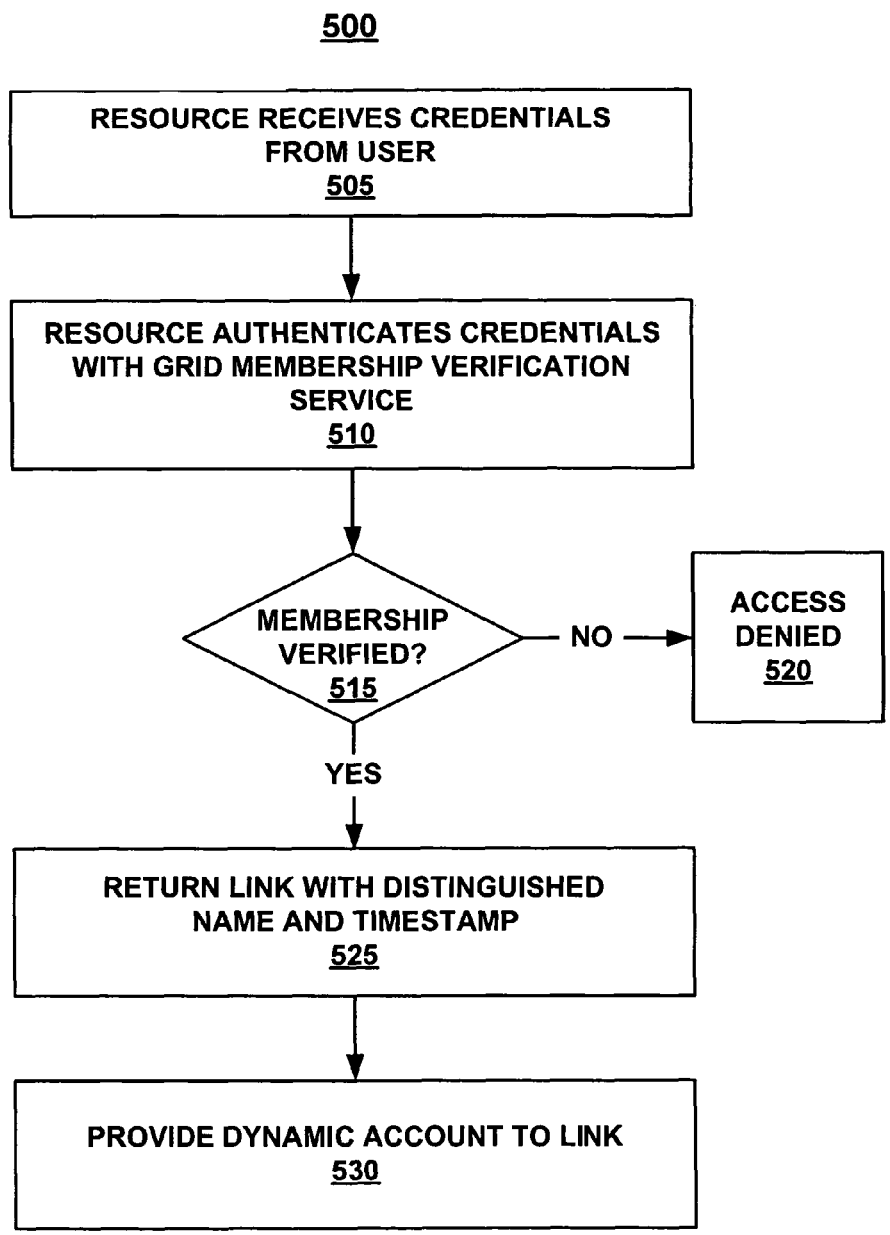
FIG. 5A shows a flowchart diagram for a method of providing unique dynamic account assignment for a user in a grid computing system, in accordance with an embodiment of the present invention.

FIG. 5A shows a flowchart diagram 500 for a method of managing a dynamic account for a user in a grid computing system, in accordance with an embodiment of the present invention. At block 505, a resource receives the credentials of a user seeking allocation of the resource. At block 510, the resource authenticates the user credentials with the GMVS. At block 515 a check is made to see if verification was successful. If verification was not successful, access to the resource is denied at block 520. If verification of the user as a member was successful, block 525 is executed.

At block 525, the resource authorizes the user and the link mapper modifies the user identifier by appending the current date and time to create a symbolic link used for a dynamic account. The current date and time is of sufficient resolution to distinguish between dynamic accounts. That is, the present embodiment authorizes the user by providing the dynamic account that is associated with the symbolic link. In the present embodiment, the user identifier is a distinguished name (DN). The current date and time, or timestamp, comprises a UNIX timestamp (e.g., seconds since 1/1/70), in one embodiment, or other date and time, in other embodiments of the invention. For example, in one embodiment the timestamp has a resolution of one millisecond. In another embodiment, the timestamp is derived from a system clock and has a resolution of approximately one microsecond.

The appending of the timestamp guarantees that all dynamic accounts allocated by a resource will have a unique user. Even if two consecutive users were to present a resource with the same user credential, the time required for authentication and authorization would result in unique timestamps being assigned to each user. At block 530, the resource allocates a dynamic account for the user using the symbolic link provided by the GMVS.

In another embodiment, the user identifier is modified by appending a value of a system counter that is incremented each time that it is accessed. The automatic incrementing of the counter upon access guarantees that a unique symbolic link will be produced when the counter value is appended.

Conventionally, a DN is a user identifier for an individual that may or may not be unique. In general, other user identifiers can be a DN, login identifier, email address, or other unique identifier, etc. However, a DN or other user identifier cannot by itself provide unique identification for members of a group participating in simultaneous sessions in a grid computing environment. That is, two or more members of a group may have the same DN. The use of an appended timestamp allows a single DN to be used for multiple members of a group without the potential for inadvertently sharing a dynamic account between two or more members of the group having the same DN.

Figure 5B:
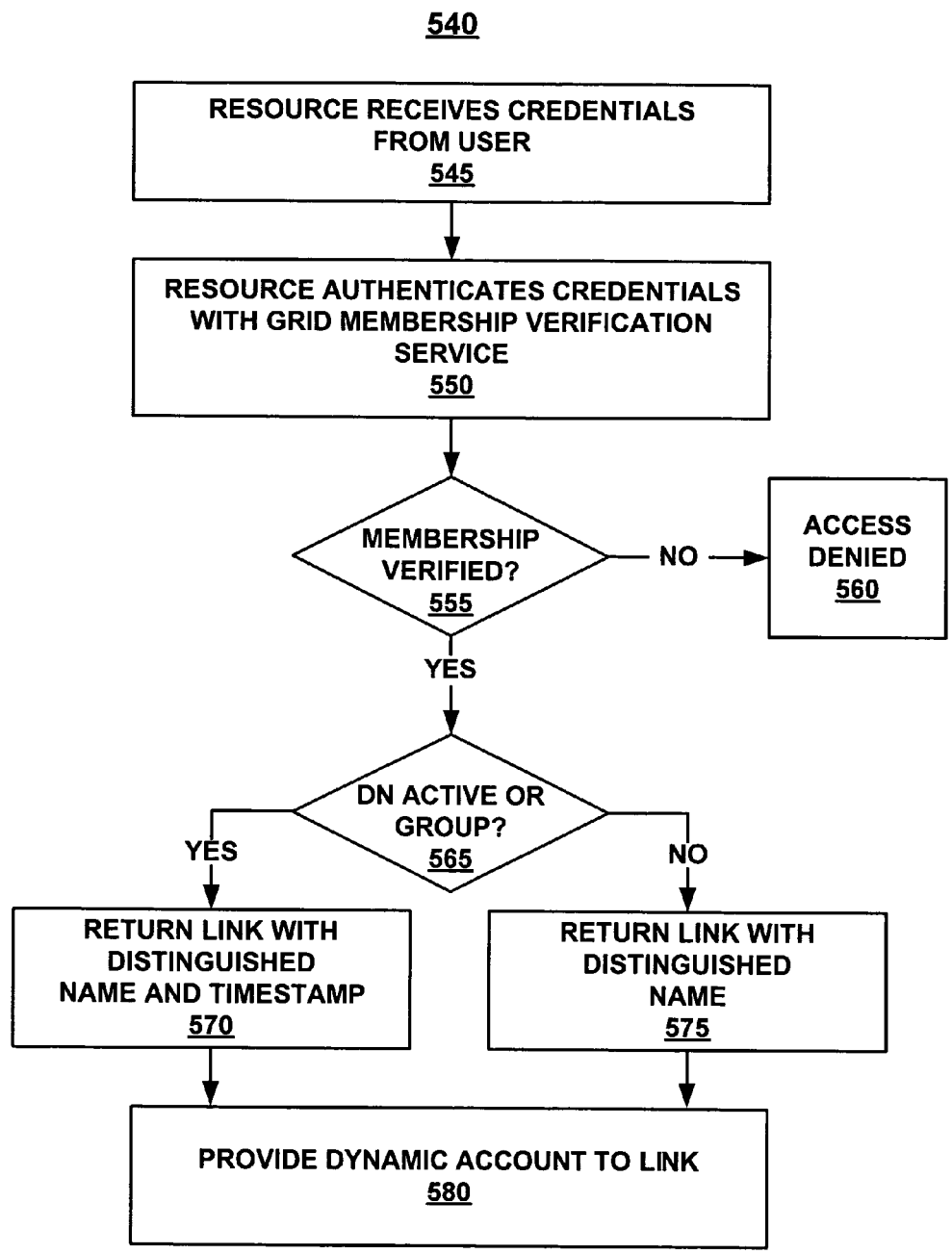
FIG. 5B shows a flowchart diagram for a method of providing unique dynamic account assignment for a members of a group in a grid computing system, in accordance with an embodiment of the present invention.

FIG. 5B shows a flowchart diagram 540 for a method of providing unique dynamic account assignment for a members of a group in a grid computing system, in accordance with an embodiment of the present invention. At block 545, a resource receives the credentials of a user seeking allocation of the resource. At block 550, the resource authenticates the user credentials with the GMVS. At block 555 a check is made to see if membership was verified. If membership was not verified, access to the resource is denied at block 560. If membership was verified, block 565 is executed.

At block 565, the link mapper checks to see if the DN is registered as belonging to a group, or is active. A DN may be registered with the link mapper as a group DN. In this case, the link mapper maintains a status field associated with a grid members DN indicating whether or not the DN belongs to a group. A group account allows many users to be aggregated into a single account for accounting purposes, while maintaining unique dynamic accounts for the members of the group.

Alternatively, a check may be made to see if the DN is already associated with a dynamic account. In this instance, the link mapper maintains an account status field indicating whether or not the DN already has dynamic account allocated to it. If the DN is active or has group status, block 570 is executed. If the DN is not active or does not have group status, then block 575 is executed.

At block 570, the user is authorized and the link mapper modifies the distinguished name (DN) of the user by appending the current date and time to create the symbolic link used for a dynamic account. The current date and time may be a UNIX timestamp (e.g., milliseconds since 1/1/70) or other date and time. At block 575, when the DN is not active or does not have group status, the link mapper uses the conventional DN to create a symbolic link. At block 580, the resource allocates a dynamic account for the user using the symbolic link, modified or unmodified, provided by the link mapper.

The present embodiment generates symbolic links within a file system by modifying a user identifier with an appended timestamp, or other unique appended value. As previously described, a distinguished name is extracted from a user's credentials to create a symbolic link that may be used to allocate a dynamic account on a resource. By checking a reference count of a dynamic account file, the present embodiment can determine if that dynamic account file already is associated with a symbolic link pointing to that file, or if that dynamic account file is available. As such, the symbolic link to a dynamic account file is generated within a file system between a user and a dynamic account by checking the reference count.

Alternatively, in another embodiment, the determination of whether a dynamic account file already is in use is determined from a table. In this case, when using a table, a symbolic link is unnecessary. FIG. 6 shows a dynamic account management data table 600 for a grid computing system, in accordance with an embodiment of the present invention. The data shown in table 600 is maintained by the link mapper, and is not necessarily stored as a table in a single location. The data shown may be derived from several sources within the system.

Table entry 605 shows a generic DN including a sequence of attributes with assigned values (e.g., entity name and domain information), a generic symbolic link precursor including the DN with the current date and time appended, and a generic dynamic account number provided by the symbolic link. Status fields G and A provide and indicator for group status and active status, respectively.

A symbolic link is typically a filename derived from the DN or other user identifier. The user identifier and timestamp are combined to produce a symbolic link precursor. The symbolic link precursor is a character string that is subsequently formatted using the appropriate syntax and allowed characters for a filename to produce the symbolic link. The syntax and allowed characters for the filename will depend upon the file system that is used. The generic symbolic link precursor represents a symbolic link.

Table entries 610 and 615 have unique DNs, and can be used without requiring a timestamp to ensure the allocation of unique dynamic accounts dyn_001 and dyn_002. In this example, the users associated with entries 605 and 610 are not members of a group. The brackets around the time stamp in the symbolic links of entries 610 and 615 indicate that the timestamp is optional. However, table entries 625 and 630 have identical DNs and are members of a group and thus require timestamps in order to guarantee the allocation of unique dynamic accounts dyn_003 and dyn_004. Entry 635 shows a dynamic account that not yet allocated, and thus is not active and does not have group status.

It should be noted that when all distinguished names (or user identifiers) are combined with a timestamp as shown in the method of FIG. 5A, the group and active status fields are not necessary for determining whether or not a timestamp is to be combined with the user identifier.

While the present invention has been described in particular embodiments, it should be appreciated that the present invention should not be construed as limited by such embodiments, but rather construed according to the below claims.

What is claimed is:

1. A system embodied on a non-transitory computer-readable medium for dynamic account management in a grid computing system comprising:
   a distributed resource management system;
   a link mapper coupled to said distributed resource management system for providing a unique symbolic link comprising a modified user identifier, wherein a user is authorized by providing a dynamic account that is associated with said symbolic link to said user, wherein said dynamic account is temporarily assigned to said user;
   a grid membership verification system wherein said grid membership verification system is a single service associated with a grid distributed resource management system for authenticating membership of said user, wherein credentials used for accessing said dynamic account can be used to access at least one other said dynamic account; and
   a grid scheduler for matching a resource of said distributed resource management system to requirements of said user for a global interactive session to launch multiple applications such that said user interacts with said launched multiple applications through separate per-application sessions.

2. The system of claim 1, wherein said symbolic link is registered with said link mapper as belonging to a group member.

3. The system of claim 1, wherein said symbolic link is a filename.

4. The system of claim 1, wherein said symbolic link is a combination of a distinguished name and a timestamp.

5. The system of claim 4, wherein said timestamp has a resolution of at least one millisecond.

6. The system of claim 1, wherein said grid membership verification system is distributed and replicated.

7. A method for dynamic account management in a grid computing system, said method comprising:
   receiving credentials from a user;
   providing said credentials to a grid membership verification service for authentication;
   authenticating said credentials by said grid membership verification service to initiate an interactive session between said user and a resource;
   modifying a user identifier associated with said user to create a symbolic link that uniquely points a user file, associated with said user, to a dynamic account file that allows access to said resource supporting an interactive session for said user, wherein said symbolic link protects said dynamic account file from access by another user;
   returning said symbolic link to said resource; and
   providing a dynamic account that is associated with said dynamic account file for said user using said symbolic link wherein said dynamic account is temporarily assigned to said user and said credential used for accessing said dynamic account can be used to access at least one other said dynamic account for a global interactive session to launch multiple applications such that said user interacts with said launched multiple applications through separate per-application sessions.

8. The method of claim 7, further comprising:
   determining that said authentication was not successful; and
   denying said user access to said resource.

9. The method of claim 7, further comprising:
   determining that said authentication was successful; and
   authorizing said user by providing said symbolic link.

10. The method of claim 7, wherein said modifying a user identifier further comprises:
    combining said user identifier and a timestamp to create said symbolic link.

11. The method of claim 10, wherein said timestamp has a resolution of at least one millisecond.

12. The method of claim 7, wherein said modifying a user identifier further comprises:
    combining said user identifier and an incremented value from a counter to create said symbolic link.

13. The method of claim 7, further comprising:
    checking an active status for said user identifier.

14. The method of claim 7, further comprising:
    checking a group status for said user identifier.

15. The method of claim 7, further comprising:
    providing said resource with user profile information associated with said user.

16. The method of claim 7, wherein said providing a dynamic account further comprises:
    authorizing said user by providing said dynamic account that is associated with said symbolic link.

17. A method for dynamic account management in a grid computing system, said method comprising:
    receiving credentials from a user;
    providing said credentials to a grid membership verification service for authentication;
    authenticating said credentials by said grid membership verification service to initiate an interactive session between said user and said resource wherein a dynamic account is temporarily assigned to said user and said credential used for accessing said dynamic account can be used to access at least one other said dynamic account for a global interactive session to launch multiple applications such that said user interacts with said launched multiple applications through separate per-application sessions;
    creating a table for mapping a plurality of user identifiers to a plurality of dynamic accounts;
    modifying a user identifier associated with said user; and
    creating a table entry that maps said user to a dynamic account that allows access to a resource supporting an interactive session for said user, wherein said table entry prevents multiple mapping of said dynamic account.

18. The method of claim 17, wherein said modifying a user identifier further comprises:
    combining said user identifier and a timestamp.

19. The method of claim 17, wherein said modifying a user identifier further comprises:
    combining said user identifier and an incremented value from a counter.

20. A non-transitory computer readable medium containing executable instructions which, when executed in a grid computing system, causes said grid computing system to perform a method of dynamic account management, said method comprising:
- receiving credentials from a user;
- providing said credentials to a grid membership verification service for authentication;
- authenticating said credentials by said grid membership verification service to initiate an interactive session between said user and a resource;
- modifying a user identifier associated with said user to create a symbolic link that uniquely points a user file, associated with said user, to a dynamic account file that allows access to said resource supporting an interactive session for said user, wherein said symbolic link protects said dynamic account file from access by another user, wherein said dynamic account is temporarily assigned to said user;
- returning said symbolic link to said resource; and
- providing a dynamic account that is associated with said dynamic account file for said user using said symbolic link wherein said credential used for accessing said dynamic account can be used to access at least one other said dynamic account for a global interactive session to launch multiple applications such that said user interacts with said launched multiple applications through separate per-application sessions.

21. The non-transitory computer readable medium of claim 20, wherein said method further comprises:
- determining that said authentication was not successful; and
- denying said user access to said resource.

22. The non-transitory computer readable medium of claim 20, wherein said method further comprises:
- determining that said authentication was successful; and
- authorizing said user by providing said symbolic link.

23. The non-transitory computer readable medium of claim 20, wherein said modifying a user identifier in said method further comprises:
- combining said user identifier and a timestamp to create said symbolic link.

24. The non-transitory computer readable medium of claim 23, wherein said timestamp has a resolution of at least one millisecond.

25. The non-transitory computer readable medium of claim 20, wherein said modifying a user identifier in said method further comprises:
- combining said user identifier and an incremented value from a counter to create said symbolic link.

26. The non-transitory computer readable medium of claim 20, wherein said method further comprises:
- checking an active status for said user identifier.

27. The non-transitory computer readable medium of claim 20, wherein said method further comprises:
- checking a group status for said user identifier.

28. The non-transitory computer readable medium of claim 20, wherein said method further comprises:
- providing said resource with user profile information associated with said user.

29. The non-transitory computer readable medium of claim 20, wherein said providing a dynamic account in said method further comprises:
- authorizing said user by providing said dynamic account that is associated with said symbolic link,

\* \* \* \* \*

UNITED STATES PATENT AND TRADEMARK OFFICE
CERTIFICATE OF CORRECTION

PATENT NO.         : 8,639,824 B1
APPLICATION NO.    : 10/666092
DATED              : January 28, 2014
INVENTOR(S)        : Sujoy Basu et al.

It is certified that error appears in the above-identified patent and that said Letters Patent is hereby corrected as shown below:

In the Claims

In column 12, line 31, in Claim 29, delete "link," and insert -- link. --, therefor.

Signed and Sealed this
Fifteenth Day of July, 2014

Michelle K. Lee
*Deputy Director of the United States Patent and Trademark Office*